United States Patent [19]
Kuehnle

[11] Patent Number: 5,325,120
[45] Date of Patent: Jun. 28, 1994

[54] ELECTROSTATIC REPRODUCTION APPARATUS HAVING A DIELECTRIC INK-PHOBIC IMAGING MEMBER AND FIELD-EMISSION WRITE HEAD

[76] Inventor: Manfred R. Kuehnle, P.O. Box 1020, Waldesruh, Rt. 103A, New London, N.H. 03257

[21] Appl. No.: 792,810

[22] Filed: Nov. 15, 1991

[51] Int. Cl.⁵ .................... G01D 15/06; G03G 15/01
[52] U.S. Cl. .................................. 346/157; 346/160; 355/326 P
[58] Field of Search ............. 346/157, 160, 155; 101/DIG. 37; 355/326, 327, 271; 271/193

[56] References Cited

U.S. PATENT DOCUMENTS

| | | | |
|---|---|---|---|
| 4,792,860 | 12/1988 | Kuehnle | 346/157 X |
| 4,864,461 | 9/1989 | Kasahara | 271/193 X |
| 5,021,829 | 6/1991 | Johnson et al. | 355/213 |
| 5,043,761 | 8/1991 | Johnson | 355/326 |
| 5,081,501 | 1/1992 | Waki et al. | 355/274 |
| 5,151,717 | 9/1992 | Jamzadeh et al. | 346/157 |
| 5,159,393 | 10/1992 | Hiroshima et al. | 355/271 X |

FOREIGN PATENT DOCUMENTS

2067523 7/1981 United Kingdom ............... 271/193

Primary Examiner—R. L. Moses
Attorney, Agent, or Firm—Cesari and McKenna

[57] ABSTRACT

A copier includes an image member having a dielectric surface and a write head for writing a pattern of electrostatic image dots on the surface. A controller controls the writing head in response to digital data representing an original document so that the image dots of the pattern may have variable field strengths and form a latent electrostatic image of the document on the surface. An inking head presents an electrostatic ink to the surface whereby the surface acquires ink only at the image dots thereon in amounts proportional to the field strengths of the image dots so as to develop the latent image on the surface. The copier also incorporates a support for supporting a printing substrate and paper grippers for mounting a printing substrate to the support. During operation of the copier, the surface and the substrate are pressed together so that the ink is released from the surface to the substrate thereby producing a copy of the original document consisting of a pattern of print dots with variable gray scale values. Subsequently, the printing substrate is removed from the support. Also disclosed are special electrostatic grippers for holding the substrate to the support.

29 Claims, 5 Drawing Sheets

ELECTROSTATIC REPRODUCTION APPARATUS HAVING A DIELECTRIC INK-PHOBIC IMAGING MEMBER AND FIELD-EMISSION WRITE HEAD

This invention relates to image reproduction. It relates especially to office copiers and other such apparatus intended to produce a relatively limited number of copies efficiently and at low cost.

BACKGROUND OF THE INVENTION

Office copiers and similar reprographic devices such as duplicators, mimeograph machines, stencil machines, print terminals and even telefax machines are used to produce copies of original input documents which have existed somewhere in analog or digital form. In the analog case, the document usually exists as a piece of paper called the "original", which is put on a platen to make a temporary image of the original from which multiple prints or copies may be generated. A digital document exists as a digital data stream created by digitizing an analog document using an input scanner. The document may also exist as a hybrid of the two as it would be on a CRT display when the image is produced in a digital format, yet is readable in an analog fashion.

In the case of any copy machine, the ultimate objective is to produce a fairly limited number of copies at a relatively slow speed but, quite importantly, with an apparatus that costs dramatically less than a printing press. In attempts to reach this goal, prior copiers and reprographic devices have incorporated such diverse technologies as xerography, ink jet printing, spirit stencil techniques, thermal-dye diffusion imaging, laser recording techniques, among others. To date, however, there does not exist a color copier which is able to produce high-quality color copies at a low enough cost to really satisfy the office copier market. The copiers themselves are very complex machines which are expensive to manufacture and to assemble. Also, many of the prior machines are very service prone which adds to their expense both in terms of maintenance costs and down time. Further, in many cases the prior copiers require special paper which invariably costs more than regular paper and may degrade over time due to exposure to heat or ultraviolet light from the sun or interior lighting.

SUMMARY OF THE INVENTION

It is an object of the present invention to provide low cost apparatus for making hard copies in color in response to digital data representing a remotely scanned color original.

Another object is to provide such apparatus which is easy to service and suffers a minimum amount of downtime.

A further object of the invention is to provide copying apparatus which can produce high quality color copies on plain paper.

Still another object of the invention is to provide a copier able to produce copies whose resolution can range from very low to very high, depending upon the particular application.

A further object in the invention is to provide a copier which is relatively small and compact, yet is able to print two sided copies in color.

Yet another object is to provide a copier with improved means for holding a printing substrate to a support for the substrate while printing.

Another object of the invention is to provide a method of making electrographic color copies.

Other objects of the invention will, in part, be obvious and will, in part, appear hereinafter.

The invention accordingly comprises the several steps and the relation of one or more of such steps with respect to each of the others, and the apparatus embodying the features of construction, combination of elements and arrangement of parts which are adapted to effect such steps, all as exemplified in the following detailed description, and the scope of the invention will be indicated in the claims.

Unlike conventional copiers, the copier described herein separates the image acquisition function from the image printing or output function. In this, the apparatus prints copies in response to a stream of digital input data representing an original document or image which may be in black and white or in color. This data may originate from a variety of devices, such as an optical scanner, an analog lens system, a CCD array, etc., able to digitize an original document or image. The digital data may be coupled directly to my copier or it may be stored on a recording medium for later playback to the copier.

In general, my color copier comprises a print cylinder which functions both as an electrode and as a dielectric signal storage member. The print cylinder has a heated, dielectric, mildly ink phobic surface in rolling contact with a paper cylinder able to pick up and hold temporarily standard paper sheets. Underlying that dielectric surface is a conductive layer which functions as an electrode when an image is being written or recorded on the print cylinder. Disposed around the print cylinder is a write station containing a writing head, an inking station capable of dispensing different color inks and an ink transfer station which is actually the nip of the two cylinders.

At the write station, a write head, responding to the incoming data deposits on the print cylinder during successive revolutions thereof, electronic latent images representing the color components or signatures of an original image, each such image being in the form of a pattern of electrostatic charge domains or dots whose field strengths vary in accordance with the gray scale or color values of the original image. As the cylinders rotate, this charge pattern is advanced to the inking station where a heated inking head presents to the plate cylinder surface during successive revolutions of the cylinder, special thermoplastic inks whose colors usually, but not necessarily, correspond to the colors of the images being recorded on that surface by the write head. Usually, for subtractive color printing, these colors include cyan, magenta, yellow and black.

As a recorded area on the print cylinder surface sweeps past the inking station, the field lines from the electrostatic charge domains or image dots comprising the latent image thereon extend momentarily toward the inking head and take "bites" of molten liquid ink whose quantities are directly proportional to the field intensities of the charge domains. Thus, the print cylinder surface, despite its ink phobic nature, acquires variable quantities of ink at these image dots which are related to the field strengths at those dots thereby, in effect, developing the latent image on that surface. The ink is held by electrostatic forces to that surface as the developed image is advanced to the ink transfer station.

At the ink transfer station, the ink, still molten on the print cylinder, and the relatively cool paper on the paper cylinder are rotated through the nip of the two cylinders. At that line of contact, there is a phase transformation of the ink which causes the ink to switch from a liquid condition to a solid condition which results in the instantaneous transfer of the ink to the paper. This adherence and the ink phobic nature of the cylinder surface overcome the electrical forces holding the ink to the plate cylinder so that there is total transfer of the ink where the ink contacts the paper. As a consequence, the image printed on the paper supported by the paper cylinder, corresponds exactly to the latent image impressed on the plate cylinder.

Equally important, the incremental sectors of the plate cylinder rotating away from the transfer station are completely devoid of ink and the removal of the ink also removes the electrical charges. However, to assure that these sectors are totally devoid of charges, they may be erased by rendering them conductive. In either event, they are ready for re-imaging so that, during successive revolutions of the print cylinder, all of the color components or signatures comprising the color original can be laid down in register on the paper sheet which remains in exactly the same place on the paper cylinder during the entire copying operation.

Whereas conventional copy machines feature print cylinders or drums coated by light sensitive photoconductor materials, the preferred print cylinder of my copier features a thin, very hard, dielectric coating which forms an optically smooth, unscratchable surface. Underlying this coating is a conductive sleeve or layer which functions as a counter-electrode during the writing operation to be described hereinafter. The sleeve is mounted on a relatively thick resilient thermal and electrical insulation layer containing heating elements which maintain the surface of the cylinder at a temperature exceeding the melting point of the ink dispensed at the inking station. That elastic layer is, in turn, mounted on a relatively light, ribbed, aluminum core. That core has internal fins which are held by a central shaft and which allow passage of cooling air through the cylinder so that the heat from the heating elements is confined to the surface of the cylinder, Appropriate electrical connections to the cylinder conductive layer and to the heaters may be made by way of slip rings on the cylinder shaft.

The write head section of the copier features one or more linear arrays of micro-tunnels aligned along the axis of the print cylinder. The tunnels are positioned so that their mouths are spaced close from the surface of the print cylinder. Positioned in each tunnel is a tiny field ignition ionization electrode which is capable of producing an ion stream which flows toward the print cylinder surface under the influence of an electrical potential established between the electrode and the conductive layer of the print cylinder. The charges from the various micro-tunnels are arranged in an imagewise pattern in response to the digital data applied to the copier.

The write head is capable of producing a checkerboard-like pattern of square image areas or dots on the print cylinder, with one side of the array furnishing all of the even-numbered dots and the other array filling in the spaces with the odd-numbered dots. A suitable time delay in the writing electronics provides for the alignment of all of the written image dots in a straight line or, if desired, in a staggered or "quasi random dot arrangement" to avoid Moire' effects, for example.

To regulate the charge acquired by the cylinder surface at each image dot, a tiny gate electrode in the form of a ring extends around the walls of each micro-tunnel near the mouth thereof. A selective potential difference is established between the gate electrode and the conductive layer of the print cylinder which allows the build-up of ionic charges on the cylinder surface only until an equi-potential is obtained with the gate electrode, at which point all further charging of the cylinder surface ceases.

Thus, the gate electrode sets the upper limit for the charge on that surface at each dot position. Provision is made for controlling the potentials at the various gate electrodes step-wise in accordance with the incoming digital data to set the gate electrodes of the various micro-tunnels at different voltage levels to control the charge levels at the various micro-tunnels. Accordingly, while the print cylinder is rotating, an electronic image can be written onto the print cylinder surface which consists of a multiplicity of dot areas charged to different levels in accordance with the incoming data. These variably charged dielectric areas will acquire variable amounts of ink at the inking station which will produce printing on the paper sheet having variable gray scale values or color densities.

The purpose of the inking station is to supply molten, dielectric inks of different colors to those surface areas of the print cylinder where electrical signals have been recorded by the writing head, to the image areas or dots thereon. The inking head at that station is positioned in close proximity to the print cylinder surface. The head has four sections, each one dedicated to a different color ink and is movable to present each section selectively to the print cylinder.

Each head section has a narrow slit extending parallel to the plate cylinder and defined by a pair of spaced-apart heated plates or lips which maintain the ink in the slit as a liquid. Resultantly, the ink propagates by capillary action along the full extent of the slit and forms a positive meniscus at the mouth of the slit which bulges toward the print cylinder, kissing the surface of that cylinder with a steady contact. However, due to the ink phobic nature of that surface, the ink is unable to "wet" that surface unless that effect is overcome by the electrostatic field forces emanating from the electrostatic charge domains or dots deposited by the write head as described above.

Thus, as a recorded area of the print cylinder advances through the inking station, the surface acquires at the image areas thereon quantities of ink which vary in relation to the field strengths of those dots. During this time, both the inking head and the print cylinder surface are maintained at equal temperatures so as to assure the visco-elastic behavior of the ink. Consequently, the imagewise density topography of the developed image on the print cylinder is maintained until the ink is moved into contact with the paper sheet at the transfer station.

At the transfer station of the copier, the paper sheet or other printing substrate is brought into intimate gentle contact with the print cylinder surface to achieve total transfer of the liquid ink on the print cylinder to the paper sheet. To this end, the paper cylinder may incorporate special electrostatic paper grippers to be described later which can pick up and retain on the cylinder and release from the cylinder, paper sheets of a variety of different sizes. The grippers help to assure the reliable transport of these sheets through the copier in precise synchronization with the writing of images on the print cylinder by the write head and the presenting of the proper color ink to that cylinder by the inking head and the transferring of the inked or developed image to paper. As is always the case with subtractive colors, a multi-layer deposition will control the color hue of the resultant print dots thus making, for example, a print dot appear black when cyan plus magenta plus yellow inks are superimposed in their full densities upon each other.

In certain applications, my copier may incorporate a second or auxiliary paper cylinder positioned in close proximity to the main one and movable selectively into contact with the print cylinder. This allows for the transfer of the paper sheet, after being printed on one side, to the auxiliary cylinder following a. figure eight transfer path that exposes the blank back side of the sheet to the print cylinder so that another image may be printed on that side of the sheet. Thus, by properly sequencing the digital data applied to the copier, or more particularly to the writing head thereof, one can make two-sided copies of sequential pages so that they arrive already collated at the copier output, i.e.; like a book, thus allowing "on demand" serial color copying without the need for expensive collating mechanisms.

Preferably, my copier incorporates the necessary buffer storage capability for allowing the printing of multiple copies of the same document and includes the necessary controls to make color adjustments desired by the operator to control scaling, color values and other printing characteristics as is now done at conventional pre-press workstations.

The printing technique described above is somewhat similar to the one disclosed in my co-pending application Serial No., 07/804,220, of even date herewith, entitled Electrical Printing Ink with Mono dispersed Synthetic Pigment Particles and Method and Apparatus for Electrically Printing Therewith, which application is hereby incorporated by reference herein. However, whereas the other application concerns primarily a high-speed color offset press which feeds paper through a succession of printing sections to produce color copies, the copier described herein requires only a single printing section and makes color copies on plain paper sheets by re-imaging and re-inking the same print cylinder during successive revolutions of that cylinder.

Thus, this copying application of my basic printing method, in contrast to the color press application, does not emphasize speed, but rather stresses the ability to make a limited number of high-quality color copies on one or both sides of plain paper sheets to serve the office copier market.

Also, in sharp contrast to the high-speed press described in my above application, the copier described herein requires only a single inking station to make plural color copies. This station contains an ink supply having up to four sections, each one dedicated to a different color ink and from which ink can be drawn selectively to the surface of the print cylinder as described above.

BRIEF DESCRIPTION OF THE DRAWINGS

For a full understanding of the nature and objects of the invention, reference should he had to the following detailed description, taken in connection with the accompanying drawings, in which.

DESCRIPTION OF THE PREFERRED EMBODIMENT

Figure 1:
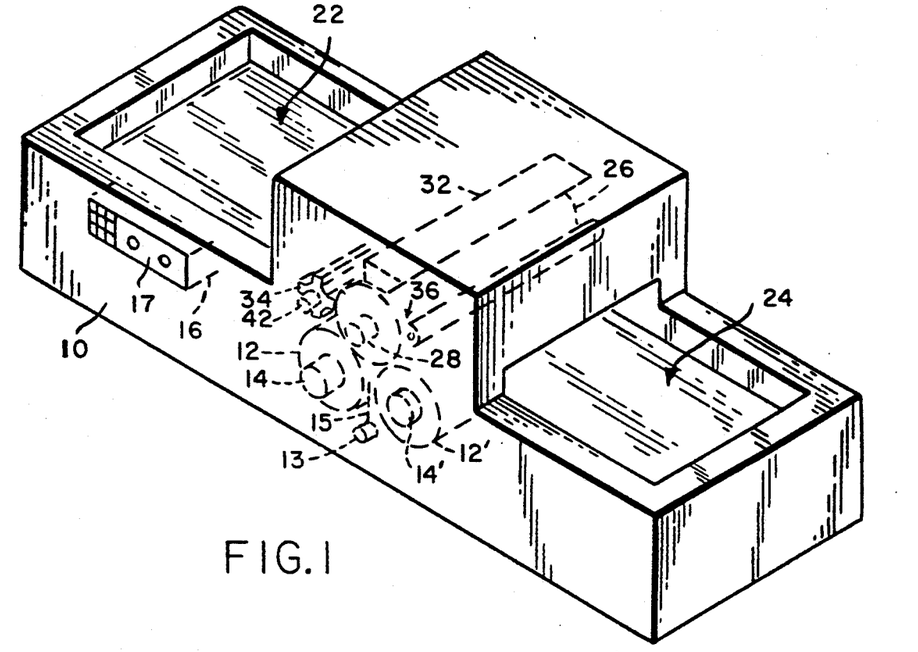
FIG. 1 is an isometric view of a copier incorporating my invention.
Figure 2:
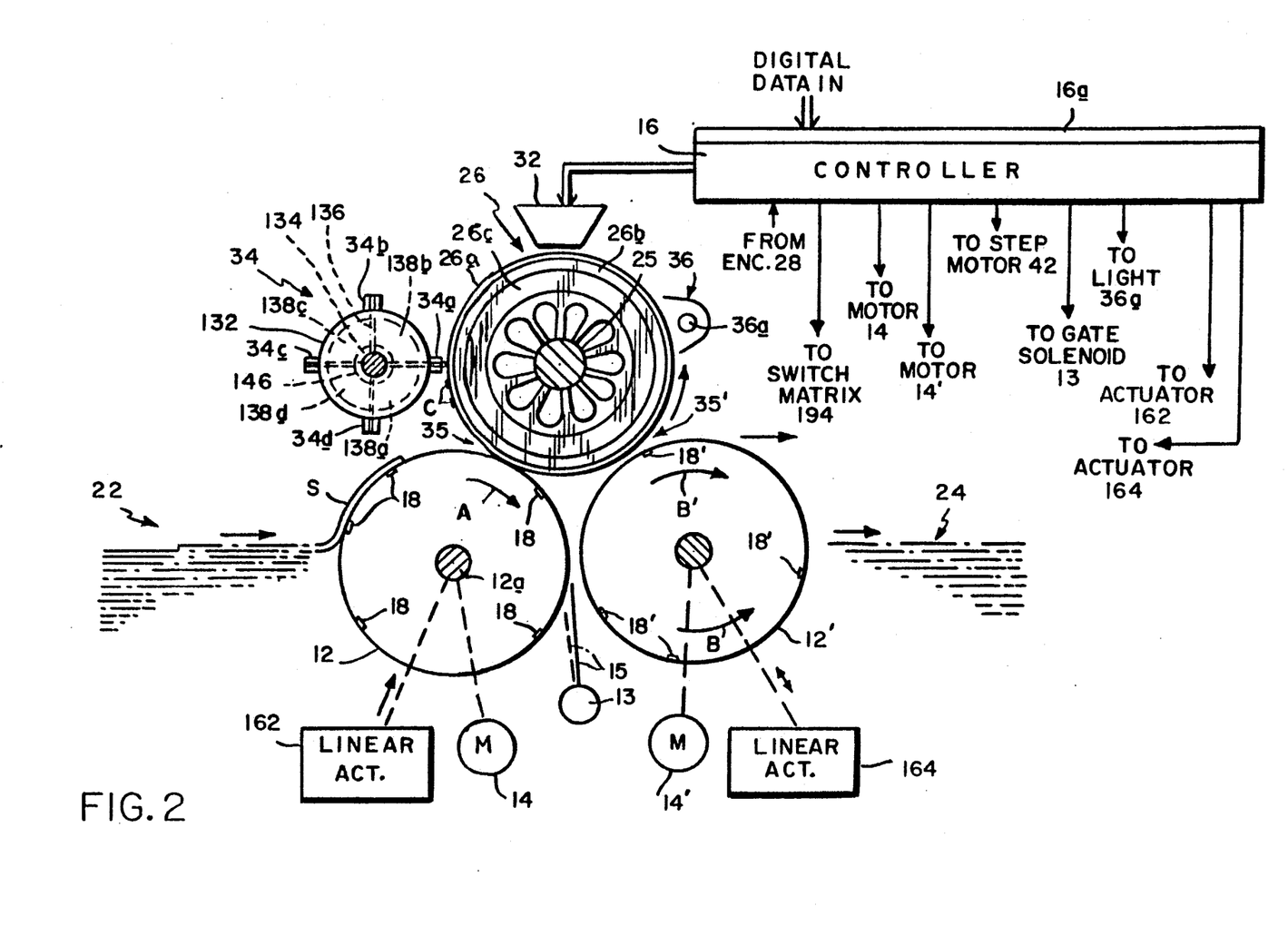
FIG. 2 is a diagrammatic view showing internal components of the FIG. 1 copier in side elevation.

Referring to FIGS. 1 and 2 of the drawings, my copier comprises a housing 10 containing a relatively large diameter paper cylinder 12 having a shaft 12a which is rotated by a step motor 14 under the control of a system controller 16 whose controls are accessible at a panel 17 in housing 10. Cylinder 12 incorporates one or more paper holders or grippers 18 arranged to engage at least the leading edge margin of a paper sheet S drawn from a paper loader 22 so that the sheet is wrapped around the cylinder when the cylinder is rotated in the direction of the arrow A shown in FIG. 2. Each gripper 18 may be a conventional clamp mechanism or a line of vacuum ports at the cylinder surface, as is well known in the art. Most preferably, however, they are special electrostatic grippers that will be described later in connection with FIGS. 8 and 9.

To unload sheet S from the copier, it is handed off to an auxiliary paper cylinder 12' in housing 10. Cylinder 12', is parallel to cylinder 12, has grippers 18' similar to grippers 18 and may be rotated in either direction by a motor 14' under the control of controller 16. When picking up a sheet S from cylinder 12, cylinder 12' is rotated in the direction of arrow B in FIG. 2. When the leading edge of sheet S has advanced to an appropriate location between the two cylinders, controller 16 activates a rotary solenoid 13 which swings a gate 15 located between the cylinders from its solid line position shown in FIG. 2 to a position against cylinder 12 shown in phantom in that figure.

At the same time, the controller 16 deactivates the appropriate grippers 18 on cylinder 12 and activates the grippers 18' on cylinder 12' so that the leading edge of sheet S is stripped any from the former cylinder and picked up by the latter cylinder as that continues to rotate. After at least a full revolution of cylinder 12', sheet S is wrapped around cylinder 12'. At this point, the controller 16 may reverse motor 14' so that cylinder 12' rotates in the direction of arrow C in FIG. 2. Resultantly, the former trailing, now leading, edge of sheet S is advanced toward the paper unloader 24. At the appropriate time, controller deactivates grippers 18' to release the sheet to unloader 24.

Since such paper loading and unloading mechanisms and their operations are well-known in the art, they will not be described in greater detail here.

The copier also includes a smaller print cylinder 26 whose shaft 25 is rotatably mounted in housing 10 parallel to cylinder 12 so that the surfaces of the two cylinders are in rolling contact. As will be described in detail later, the surface 26a of cylinder 26 is heated and is formed of a dielectric material. The surface of paper cylinder 12, on the other hand, is maintained at room temperature. Preferably, the two cylinders are coupled together by appropriate timing chains or gearing (not shown) so that they rotate with no slippage. The angular position or phase of roller 26 is monitored by a shaft encoder 28 coupled to shaft 25 and whose output is applied to controller 16.

Disposed around print cylinder 26 within housing 10, in order, are an electronic write head 32, a four-color inking head 34, a transfer station 35 constituted by the cylinder nip and an erase head 36 all of whose functions are controlled by controller 16.

Controller 16 receives input signals as a digital data stream representing the gray scale or color values of a color original to be copied. Usually, the digital data will originate from a color scanner or other source. It may be received by the copier directly over a telephone line or from a digital storage disk or tape. In any event, the data comprises digital expressions for the color components or signatures of a color original, usually the subtractive color components cyan, magenta and yellow. In subtractive color printing, there may also be a black component used for undercolor removal. Provision may also be made for adding a fifth or top printing component in the form of a transparent "ink" or coating to form a protective overlay on the printed areas of the copies.

The data representing the various color components of the color original are applied to my system in successive strings. For example, the system may receive the data in the order cyan (C), magenta (M), yellow (Y) and then black (B), followed by the transparent ink, if desired. Preferably, a mass memory 16a is associated with controller 16 for storing the relatively large amount of data necessary to operate the system.

In order to print on sheet S wrapped around paper cylinder 12, controller 16 controls the write head 32 so that on successive revolutions of the print cylinder 26, the write head writes on the print cylinder surface 26a electrostatic images corresponding to the four color components represented in the input data stream. That is, during the first revolution of cylinder 26, an image I representing the cyan component is applied to cylinder surface 26a. During the second or a succeeding revolution of that cylinder, an image representing the magenta color component is impressed on that surface, and so on.

The inking head of the present system is composed of four sections 34a to 34d spaced around a common axis of rotation extending parallel to cylinder 26. The head may be rotated about that axis by a step motor 42 under the control of controller 16. Each of the sections 34a to 34d is heated and supplies, in a molten state, a special electrostatic thermoplastic ink, described in detail in my above application, in one of the four printing colors. At the beginning of each write operation on cylinder 26, controller 16 ordinarily controls motor 42 to rotate head 34 to position opposite the cylinder surface 26a, the head section that supplies the ink color corresponding to the image being written on the cylinder at that time. For example, when the cyan image I is being written on cylinder 26, the head section 34a which dispenses cyan ink is disposed opposite the cylinder surface 26a as depicted in FIG. 2. Resultantly, when the electrostatic image on cylinder surface 26a is advanced past the inking head 34, liquid cyan ink C from the operative section 34a will be acquired by the charged areas of that image, thereby developing a cyan image on surface 26a. As noted above, cylinder 26 is heated so that ink remains in a molten state on surface 26a, and adheres to the surface at those charged areas.

As will be described in more detail later, the amounts of ink C picked-up or acquired by the charged areas are proportional to the field intensities emanating from these areas. This variation of the field intensities over the image on the print cylinder surface 26a facilitates reproduction of a full gray scale.

As the cylinder 26 continues to rotate during this first revolution of that cylinder, the developed portion of the image on the cylinder surface 26a is advanced to the ink transfer station 35 constituted by the nip formed by the cylinders 12 and 26. Controller 16 controls the position of the image around cylinder 26 so that when that image is developed and advances through the nip, the inked image thereon is transferred to the proper location on the paper sheet S wrapped around cylinder 12. As will be seen, there is a total transfer of all of the ink from the cylinder surface 26a to the sheet S at the transfer station because the transfer is accomplished thermo-dynamically by means of a phase transformation of the ink which switches from a hot melt liquid condition to a solid state condition at the line of contact with the relatively cool paper sheet S.

The charged areas of the cylinder surface 26a, now devoid of ink, are advanced past erase station 36. This station contains means, such as an ultraviolet light 36a, for rendering the cylinder surface 26a conductive so that the charges thereon become dissipated. Thus, when the cylinder surface 26a exits station 36, it is completely discharged and ready for re-imaging by write head 32 during the next or a succeeding revolution of cylinder 26. In the meantime, an image representing one color component, i.e., the cyan component, of the original image will have been printed on the sheet S.

As the cylinder 26 begins the next or a succeeding revolution, controller 16 controls write head 32 in accordance with the incoming digital data so that the write head begins to write a second electrostatic image on the surface of that cylinder representing a second color component of the original image, e.g., the magenta component. Also, controller 16 controls motor 42 to rotate the inking head 34 so that the head section 34b, which dispenses magenta ink, is positioned opposite the print cylinder. Accordingly, when the magenta image is advanced past the inking head 34, the charged areas of the dot pattern comprising that image will acquire magenta ink from the ink head section 34b. As before, when that developed image is advanced through the ink transfer station 35 at the cylinder nip, the magenta image will be transferred to the paper sheet S. Since the two cylinders are operatively coupled together and since the laying down of the images on cylinder 26 is closely controlled by controller 16, the magenta image will be printed on sheet S in exact register with the cyan image printed thereon during the earlier revolution of cylinder 26. After advancing through the ink transfer station, the cylinder surface 26a is erased at erase station 36 and is now ready to receive an electrostatic image representing the third component or signature of the color original being copied, i.e., the yellow component.

Two more similar printing cycles are executed for the yellow and black color components, with the inking head 34 being positioned during each cycle to dispense the color ink that corresponds to the color of the image then being written by write head 32. Thus, after at least four revolutions of print cylinder 26, a four color print will have been printed on paper sheet S corresponding to an original color image represented by the digital data fed to controller 16.

If it is desired to provide a protective overlay for the printing, the printing head 34 is provided with a fifth section (not shown) for dispensing a transparent "ink". This transparent component may be the same as the other inks, but without a color pigment. To apply this protective layer, a fifth printing cycle is executed in which the signals applied by controller 16 to the write head causes the head to write on those areas of the print cylinder surface previously written on during at least one of the four previous printing cycles. Also, controller 16 positions inking head 34 so that the transparent ink is acquired by those areas. Thus, when that final ink layer is transferred to sheet S at station 35, the entire printed image will be protected under a hard, scratch-resistant barrier layer or shell. If desired, that final layer may be of a material which excludes ultra-violet light to minimize fading of the underlying color image.

At this point, controller 16 may deactivate the write head 32 and control motor 42 to rotate the inking head 34 to an intermediate position so that none of the head sections 34a to 34d is disposed opposite the cylinder surface 26a. Then, after the entire paper sheet S has passed through the cylinder nip for at least the fourth time, controller 16 may control cylinder motors 14 and 14' and the cylinder grippers 18 and 18' and the gate solenoid 13 so that sheet S is transferred from cylinder 12 to cylinder 12' as described above. After the sheet is fully wrapped about cylinder 12', the direction of that cylinder may be reversed and grippers 18' may be deactivated to pass sheet S to the paper unloader 24, thereby completing the printing operation.

The present system can produce a four color copy quite quickly. Furthermore, by exercising appropriate control over the timings of the signals applied to the write head, the system may vary the rasters and screen angles of the color components or signatures that are applied successively to paper sheet S as aforesaid. Thus, my system stresses exactness and fidelity of image reproduction in response to uniquely recorded electrostatic charge patterns on the print cylinder, rather than printing at press speed. Furthermore, the ink is supplied in a slow switching mode, with the different color inks being deposited and transferred successively to the paper in synchronism with the switching of the recording of the different color separation images on the print cylinder. Such features render my copier quite unlike conventional printing presses.

Figure 4:
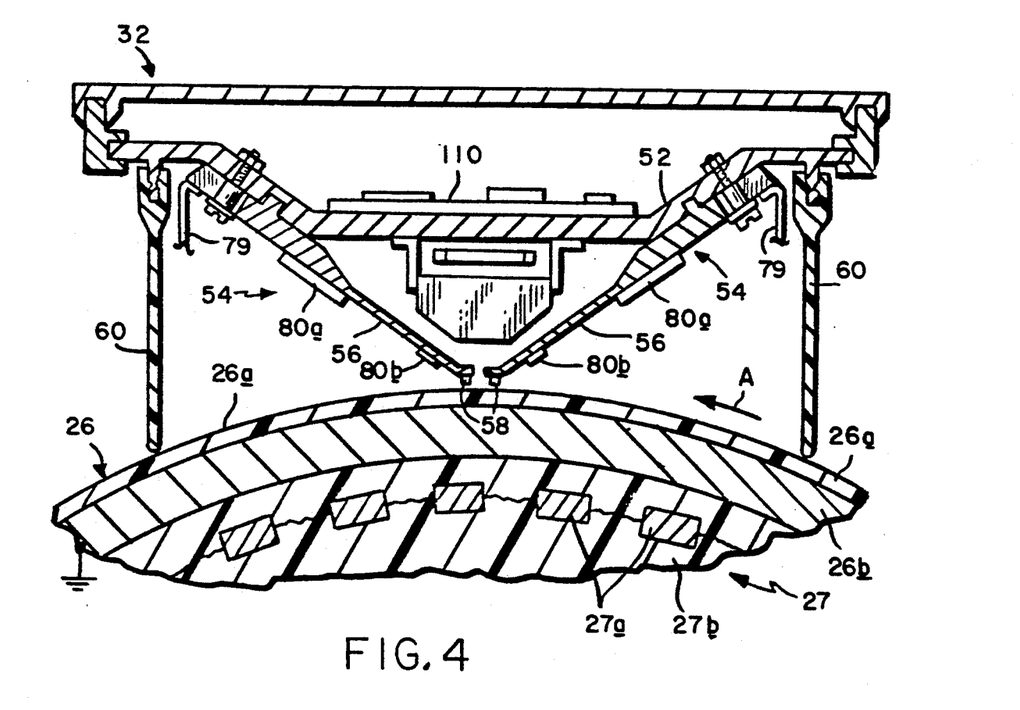
FIG. 4 is a sectional view on a still larger scale taken along line 4—4 of FIG. 3.
Figure 7:
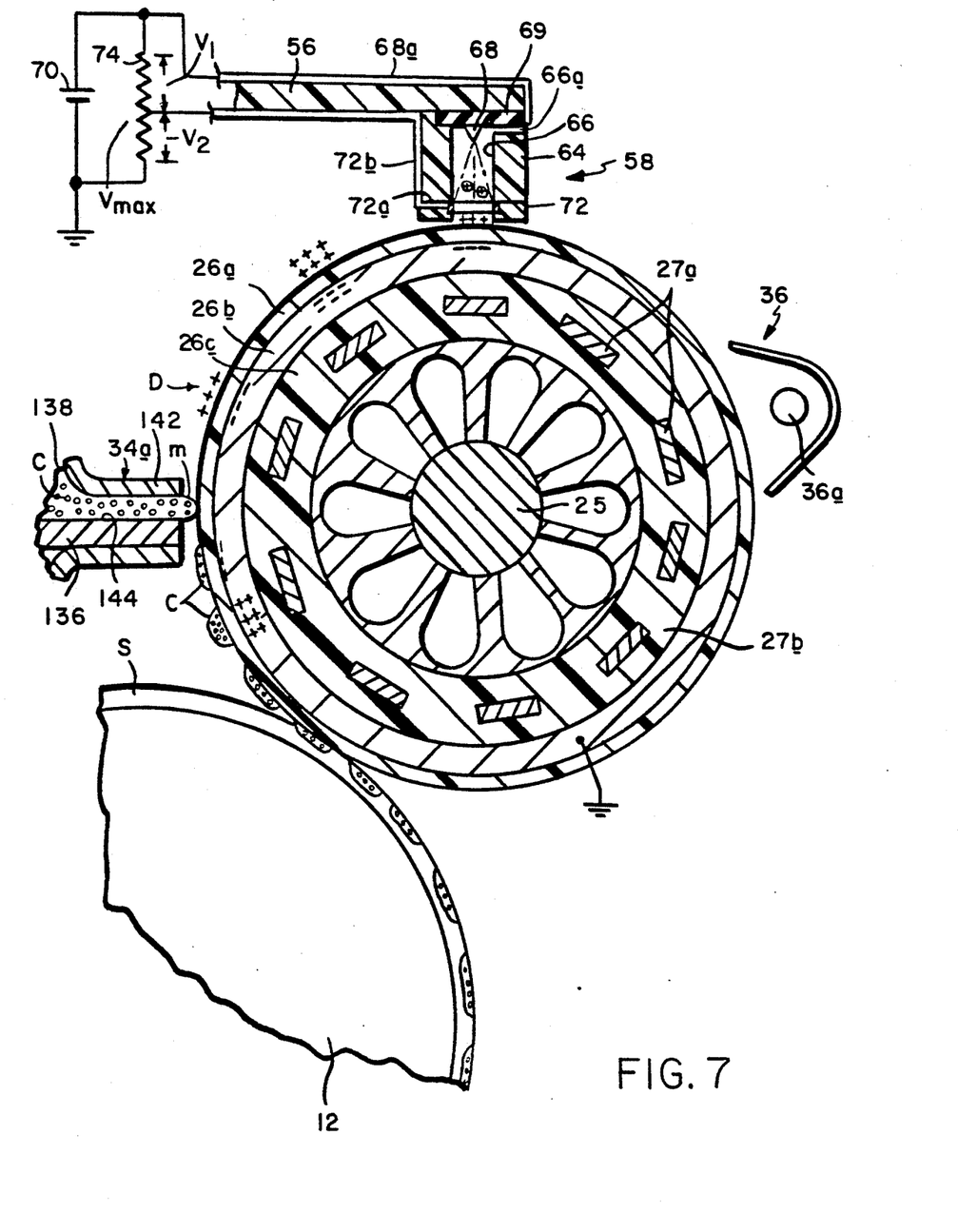
FIG. 7 is a fragmentary sectional view showing certain elements of the copier.

Referring now to FIGS. 2, 4 and 7, print cylinder 26, which is described in detail in my above-identified application, has a thin, e.g., 1 micrometer, surface layer 26a, of a hard, heat-resistant, dielectric material such as silicon nitride. Underlying layer 26a is a somewhat thicker, e.g., 100 micrometers, conductive layer 26b, which is grounded to the machine frame. Under layer 26b is a heating layer 26c. This layer may consist, for example, of a circular array of heating wires or elements 27a embedded in a body 27b of resilient electrical insulating material. Electrical connections to the heating elements may be made via slip rings (not shown) on the cylinder 26 shaft. The heating elements 27a are capable of heating the cylinder layers 26a and 26b to a temperature, e.g., 150° C., above the melting point of the inks supplied at the inking station 34.

Figure 3:
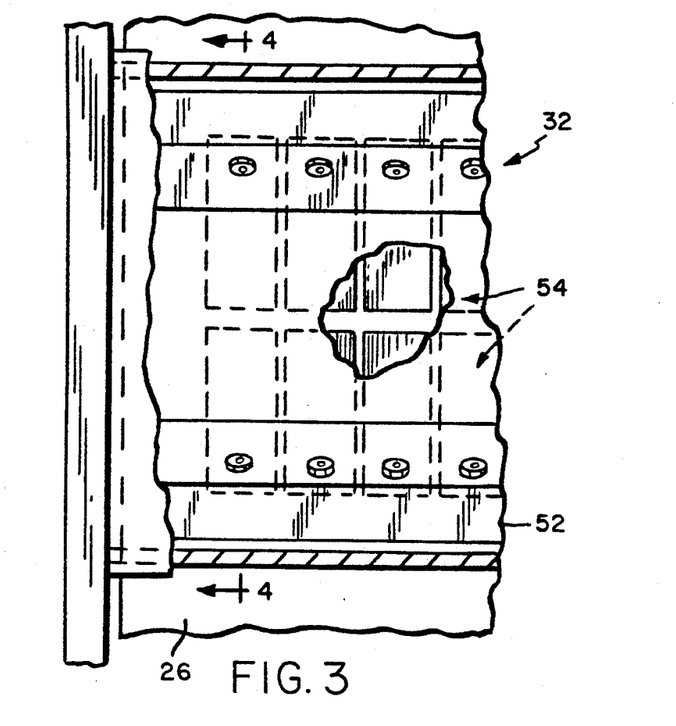
FIG. 3 is a fragmentary plan view, with parts broken away and on a much larger scale, showing the write head of the FIG. 1 copier in greater detail.

Referring to FIGS. 3, 4 and 7, illustrated write head 32 comprises a stationary elongated support beam 52 spaced opposite and parallel to cylinder 26. Adjustably mounted to beam 52 is a series of emitter units 54 whose combined length is comparable to that of the cylinder. For ease of installation and to maximize the footprint available for the emitter units, these units may be adjustably mounted to bar 52 in two rows, with the units of the two rows facing toward one another as best seen in FIG. 3. This writing head is capable of writing a checkerboard pattern of image areas or dots on the print cylinder with one side of the array writing the even-numbered dots, while the other array writes the odd-numbered dots. A suitable time delay in the writing electronics allows for alignment of all the written dots in a straight line or, if desired, in a staggered arrangement.

As shown in FIGS. 3 and 4, each emitter unit 54 comprises a generally rectangular, tongue-like insulating substrate or plate 56, e.g., of pressure-melt glass. Present at the underside of each substrate 56 is a plurality of tiny field-emission electrodes or electron emitters 58 whose edges project slightly from the substrate. Emitters 58 are spaced apart across one end of the substrate in a straight line. For ease of illustration, we have shown each emitter unit 54 as containing only a relatively few emitters 58. In actuality, a typical unit 54, 10 centimeters wide, may contain as many as 1000 emitters 58. The circuitry for servicing the emitters of each emitter unit 54 may be mounted directly on the unit's substrate 56 as will be described later.

As best shown in FIG. 4, a pair of flexible blades 60 extend down from beams 52 toward the print cylinder 26. The purpose of the blades is to provide a confined space around the emitter units 54 for the circulation of an inert gas, e.g., helium, to cool the units and to minimize ionization of the atmosphere surrounding emitters 58 when the print head is in operation.

Figures 5, 6:
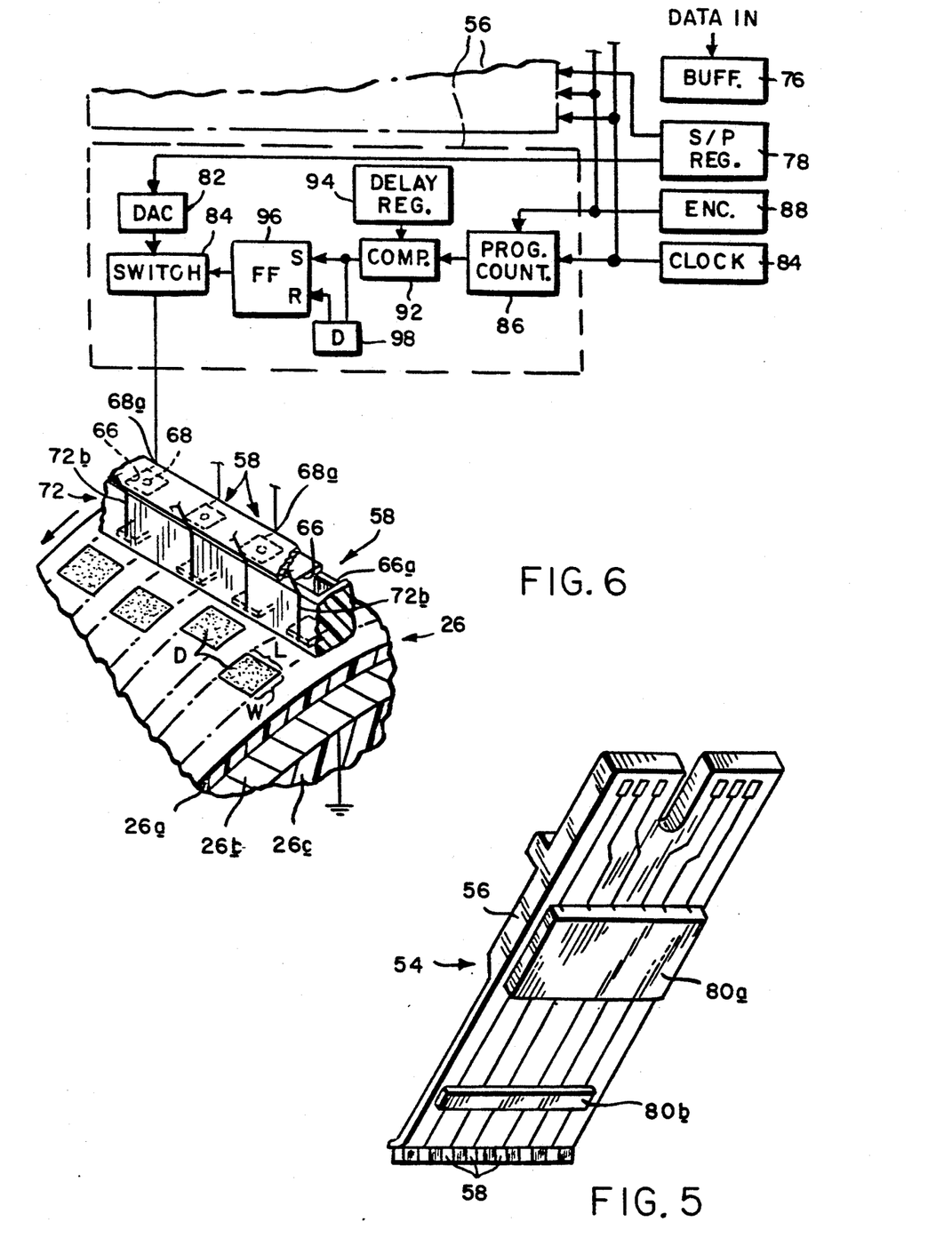
FIG. 5 is a isometric view showing a part of the FIG. 4 write head in still greater detail.
FIG. 6 is a fragmentary diagrammatic view further illustrating the operation of the write head.

A preferred configuration for the emitters is illustrated in FIGS. 5 to 7. As shown there, each emitter 58 is formed in an insulating rectangular body 64 and comprises a very small micro-tunnel 66. For example, in a copier capable of printing a 150 dot per inch (DPI) raster, the tunnels 66 may be only in the order of 166 micrometers on a side. Positioned in each tunnel is at least one needle electrode 68. Preferably, all of the electrodes for each line of emitters are printed or formed on a nonconductive strip 69 adhered to the top of a body 64 so as to cover tunnels 66. A small notch 66a is formed in the rear wall of each tunnel to allow for circulation of air or gas through the tunnel. Connections to the electrodes 68 are established by printed conductor runs 68a printed on the underside of strip 69 at the upper ends of the tunnels as shown in FIG. 7. Emitters 58 are all oriented with respect to the cylinder 26 so that all of the tunnels 66 extend radially toward the cylinder surface 26a like microscopic chimneys.

During a write operation, selected emitters 58 are activated by application of positive voltage pulses to the corresponding electrodes 68 of sufficient magnitude (e.g., about 400 volts DC) to cause breakdown in the associated tunnels 66. This pulse may be applied by any suitable power source, illustrated diagrammatically by a battery 70 in FIG. 7, connected between the electrode and the conductive cylinder layer 26b, which, as noted above, is at electrical ground. When breakdown occurs in a tunnel 66, virtually all gas molecules in the proximity of the electrode 68 lose at least one electron under the influence of the immensely strong electrostatic field present there. These electrons are absorbed by electrode 68, causing a tiny halo of resonating ions and free electrons to swirl around electrode 68 with intense energy. The ionic species, i.e., positive ions, tend to migrate away from electrode 68 to the lower electrical potential present at the lower end of tunnel 66 as shown in FIG. 7, where they encounter, and may be neutralized by, the prevailing current in a ring-like gate electrode 72 which extends around the wall of the tunnel 66 near the lower end or mouth thereof. Each electrode may receive such current by way of a plated via 72a extending through a wall of tunnel 66 and a printed conductor run 72b extending up along the surface of body 64 as shown in FIG. 7.

As the positive ions flow toward electrode 72, they are attracted by the electrically grounded substrate 26b of cylinder 26 which is more negative than electrode 72, and, therefore, attracts the positive ions more strongly. The necessary potential difference can be created, for example, by a simple variable voltage divider such as illustrated in FIG. 7. Specifically, a variable resistor 74 limits the voltage $V_2$ from power supply 70 that reaches gate electrode 72, but does not so limit the voltage applied to cylinder layer 26b.

The arriving ions accumulate on dielectric surface 26a until they reach a voltage potential equal to that of gate electrode 72 (higher local potentials simply result in current back flow into electrode 72, a condition which prevents their persistence). Therefore, the voltage applied to electrode 72 effectively sets the upper limit for the charge deposited on the dielectric cylinder surface 26a, thereby enabling precise control of the coulombic charge density (Q=VC) thereon.

The tunnel 66 cross-section determines to a great extent the dimensions of a print dot Thus, an array of tunnels, rectangular in cross-section, along the longitudinal axis of the print cylinder, with individual gate electrodes 72, facilitates deposition of rectangular dot-size charge domains, each having an individual coulombic charge density as controlled by the voltage on the gate electrode 72 associated with the corresponding tunnel. These levels may be set digitally, so that individual emitters 58 are separately activated and controlled by controller 16 to produce electrostatic images, composed of imagewise patterns of charge, on the print-cylinder surface 26a.

If the gate electrodes 72 in all of the emitters 58 are set to the same voltage, the electrostatic image written on cylinder 26 will be composed of charged image areas or dots having a uniform charge density. In this event, all of these areas will pick up a uniform amount of ink from inking head 34 during the inking portion of the proofing process and the image printed on sheet S will be composed of print dots having a uniform color density. On the other hand, if different voltages are present at the various electrodes 72, Corresponding to gray scale or color values of the color original being copied, at the inking station, different amounts of ink will be picked up by the different image areas on cylinder surface 26a and the developed image transferred to sheet S will be composed of ink or print dots which vary in amounts (i.e., thicknesses) in correspondence with the color values in the original.

By offsetting the emitter 58 arrays at half-pitch, the two parallel arrays in head 32 can cover the odd and even dot positions along the cylinder surface 26a without causing detrimental separation spaces between the dots as they are charging the surface in coherent rows. These rows may be made linear by suitable delay-firing circuitry; see FIG. 6.

The control circuitry shown in FIG. 6 can set the potential of the gate electrode at each emitter 58 to any of a plurality of levels. For example, the ability to control each emitter 58 to deposit any of 32 charge densities results in the ability to create any of 32 possible field densities at each image-dot location on the cylinder surface 26a, with such fields reaching into the molten, electrostatically responsive ink from inking head 34 to capture field-intensity-proportional amounts (i.e., thicknesses) of ink, all as described in the above identified application.

Various circuits known in the art may be incorporated into controller 16 and emitter units 54 to control the operation of entire arrays of emitters 58 in accordance with an incoming digital data stream. Once such arrangement is shown diagrammatically in FIG. 6. The image data arriving on a high-speed data line from a mass memory 16a in controller 16 may be applied by way of a buffer memory 76 to a serial-to-parallel shift register 78, which distributes the data, via cables 79 (FIG. 4) to similar circuit modules 80a and 80b (FIG. 5) carried by the various emitter units 54. The circuit components on each unit may serve all of the emitters on that unit. Such modules include a digital-to-analog converter (DAC) 82 for each emitter 58. The output of the DAC is applied to the corresponding emitter, to control the voltage on the gate electrode 72 thereof, by way of a switch 84.

Switch 84 is turned on and off at the appropriate times to enable emitter 58 to lay down an image area or dot D of a selected width W at a selected location around the print cylinder 26. For this, a master clock 84, that serves all units 54 and which may be in controller 16, applies clock signals to a program counter 86 on each unit. Counter 86 commences counting when it receives a signal from shaft encoder 28 (FIG. 1) rotated by cylinder 26, which itself rotates at a selected fixed speed. The signal from shaft encoder 28 signifies that the cylinder is at a selected phase angle, e.g. 0°. Counter 86 thus emits an output pulse to close the corresponding switch 84 when it reaches a selected count corresponding to the cylinder phase angle at which emitter 58 is to apply an image dot D to the cylinder surface 26a.

To allow the position of the image dot D to be adjusted around the cylinder to some extent for image registration, etc., the signal from counter 86 may be applied to a comparator 92 which also receives the contents of a register 94. Comparator 92 issues an output signal when the number in counter 86 equals that in register 94. Changing the number in the register shifts, around the circumference of the cylinder, the leading edge of the image dot D produced by that emitter 58. This is the left edge as viewed in FIG. 6.

The output of comparator 92 is applied to the set (S) input of a flip flop 96 and, via a delay 98, to the reset (R) input of the same flip flop so that the flip flop provides, to switch 84, an actuating signal of a fixed duration that, along with the width of the emitter tunnel 66, determines the width (W) of the image dot D laid down by emitter 58. The length (L) of the image dot is determined by the length of the emitter tunnel 66 cross-section.

For ease of illustration, the various timing and reset signals to synchronize the elements of the circuit in FIG. 6 have not been shown. They may be produced in any one of a number of ways known to those skilled in the art.

Refer now to FIGS. 2 and 7, the inking station 34 comprises a hollow thermally conductive roll or tube 132 having an axle 134 which extends parallel to cylinder 26 and is rotatable by motor 42 (FIG. 1). The space inside roll 132 is divided by partitions 136 into four equal-size ink storage chambers 138a to 138d, the ends of those chambers being closed by suitable end plates 140 (not shown).

As best even in FIG. 7, formed at the periphery of roll 132 adjacent to each partition 136 is a radial, outwardly extending lip 142. Lip 142 is spaced slightly from the adjacent partition 136 to provide a lengthwise slit 144 which communicates with the interior of the adjacent chamber so that the ink in that chamber, when liquid, can flow into that slit. Roll 132 can be rotated in either direction by motor 42 under the control of controller 16 so that the slit 144 of each inking head section 34a to 34d can be positioned directly opposite plate cylinder 26, i.e., in the position of slit 144 of section 34a depicted in FIGS. 2 and 7. When the slit is in that position, the mouth of the slit is spaced very close from the cylinder surface 26a. The roll can also be located at intermediate positions so that no head section is disposed opposite cylinder 26.

Heaters 146 are provided inside roll 132 for maintaining the temperature of the inking head, including the lips 142, above the melting point of the thermoplastic inks contained therein, e.g., above 150° C. Power to the heaters 146 may be provided by way of slip rings (not shown) on axle 134. Also, suitable access openings (not shown) may be provided in a roll 132 end plate to refill the ink chambers with ink.

When heaters 146 are energized, the inks C, M, Y and B in chambers 138a to 138d, respectively, remain liquid and are able to flow to the mouths of the various slits 144 to form lengthwise menisci m which protrude from the mouths of slits 144. When one of those slits is located opposite cylinder 26, the ink meniscus m protruding therefrom just kisses the cylinder surface 26a with a steady contact, as shown in FIG. 7.

During printing, as the charged cylinder surface 26a rotates past the operative inking head section, e.g., section 34a in FIG. 7, the charged image areas or dots D attract and hold, via their respective outreaching electrostatic fields, molten ink from the ink meniscus m contacting the surface 26a. However, due to the mildly ink-repellent nature of surface 26a, that ink does not wet or transfer spontaneously to uncharged areas of the cylinder surface.

As described in detail in my above-identified application, during this ink transfer step, it is both the dielectric carrier material comprising the special ink and the charged particles therein (which are attracted as a composite liquid matrix to the image areas D) that serve as the ink transport agent. That is, in the presence of the field at each image area, the molecular structure of the carrier forms chains of dipoles oriented along the electric field lines emanating from the plate cylinder. These dipoles interact with the charges in the ink particles so that those charges reorient to accommodate to the polarity of the field lines. In other words, if there is a positive ionic charge on the surface of the print cylinder as shown in FIG. 7, the carrier dipoles orient themselves along the field lines to present their negative poles to the cylinder surface. The particles dispersed in the carrier likewise become polarized to conform to and propagate the field pattern, thereby becoming electrostatically bound to the carrier so that the ink carrier material and particles transfer together in a fixed ratio to the cylinder surface 26a.

The ink volume, (i.e., depth, which translates into thickness on cylinder surface 26a), of the matrix that is attracted to a particular image area or dot D on plate cylinder surface 26a depends on the magnitude of the electrostatic field at that area. In other words, the principle of physics at work is not charge compensation, but rather field neutralization through an interacting matrix of particles and carrier material. This ability to produce different thicknesses of ink deposits within the boundaries of each image area of dot D by varying the field intensity at each dot facilitates the generation of a gray scale for each dot ranging from 0 to 2.0 reflection density, approximating the gray scale of a standard photographic film.

Because of the dipole affinity that exists between the particles and the carrier material comprising the ink, a fixed amount of carrier accompanies each particle as the ink is deposited onto surface 16, thereby also preserving without depletion the two components in the same ratio within the ink remaining in the slit 144. The cohesion of the carrier material and its surface tension also facilitates the maintenance and regeneration of a fresh ink meniscus m at the mouth of slit 144 after ink is withdrawn from the slit, as these forces within the molten ink combine to close in and fill the void in the body of ink remaining in the slit.

Once the different amounts of ink are acquired by the plate cylinder surface 26a, since that surface is heated as described above, the ink remains in its molten state as it is transported to the ink transfer station 35 (FIG. 1). At that transfer station, the paper sheet S is mildly pressed against surface 26a to form the image pattern on sheet S. During this transfer step, the ink carrier material serves as the transport agent to effect transfer of the ink to sheet S, which unlike the plate cylinder surface, is not heated and remains generally at room temperature.

The ink at each dot position may not solidify throughout instantaneously; the rate of solidification depends on the size of the ink "bite" at that image dot. For example, if the amount of ink adhering to a particular image dot on cylinder 26 is relatively small (i.e., it corresponds to the low end of the gray scale), as soon as that "thin" ink spot is brought into contact with the paper sheet S, it will cool and solidify throughout its entire thickness and will thus offset completely from the print cylinder 26 to sheet S as it leaves the nip of the plate and paper cylinders.

However, if a relatively large amount of ink is present at a given image dot on cylinder 26, only the surface of that ink spot will solidify upon contact with the relatively cool sheet S. For complete transfer of ink from cylinder 26 to sheet S, it is essential, then, that at the point of transfer, the cohesion force of the ink equal or exceed the difference between the adhesion force that adheres the ink to sheet S and the electrostatic force that adheres the ink to the cylinder surface 26a, for all ink-spot thicknesses representing the full gray scale being printed. These characteristics of the ink, the image cylinder and the sheet S assure that ink deposits having different thicknesses will be plastic or compliant enough to accommodate the change in the spacing of the moving cylinder and sheet S surfaces that occurs during transfer, yet cohesive enough to offset completely to the sheet S.

If desired, my copier may also be made with a two-side copying capability. For this, the print cylinder 12 is mounted in housing 10 so that it can moved between an operative position in which it is in rolling contact with the print cylinder 26 as shown in FIG. 2 and a retracted position wherein it is spaced slightly away from that cylinder. Cylinder 12 may be moved between its two positions by suitable means, such as the linear actuator 162 shown in FIG. 2, under the control of controller 16. The auxiliary paper cylinder 12' is similarly mounted so that it can be controllably moved by a second linear actuator 164 between a first position wherein it is in rolling contact with cylinder 26 and a second position in which it is spaced away from that cylinder as shown in FIG. 2. The two actuators 162 and 164 are operated out-of-phase by controller 16 so that when cylinder 12 is in contact with print cylinder 26, the auxiliary cylinder 12' is retracted away from cylinder 26, and vice versa.

In order to make a copy on both sides of sheet S, when the apparatus completes a print on the upper side of the sheet S wrapped around the paper cylinder 12, controller 16 rotates cylinder 12' in the direction of arrow B and actuates the rotary solenoid 13 to move the gate 15 to the position shown in phantom in FIG. 2, just as was done when unloading the sheet from the copier as described above. Just before the leading edge of the paper sheet reaches the gate 15, the controller deactives the paper gripper 18 on cylinder 12 thereby releasing that leading edge from cylinder 12. At the same time, the controller activates the gripper 18' on the auxiliary paper cylinder 12' that is adjacent to gate 15 with the result that the leading edge margin of the sheet S is handed off by cylinder 12 to cylinder 12'. As cylinder 12' continues to rotate, the sheet S becomes wrapped around that cylinder with the unprinted back side of that sheet now facing outward and the sheet is held to that cylinder by the grippers 18'.

After a full revolution of cylinder 12', controller 16 reverses the rotation of that cylinder as if to off load the sheet. However, rather than releasing the sheet, the controller commands motor 14' to continue its rotation in the direction of arrow C and maintains grippers 18' in their active condition. The controller also issues a signal to actuator 162 which retracts the paper cylinder 12 away from the print cylinder 26. Another similar signal to the actuator 164 causes that actuator to advance the auxiliary paper cylinder 12' into rolling contact with the print cylinder 26.

As soon as the paper sheet S was handed off to auxiliary cylinder 12', controller 16 began controlling the write head 32 to commence writing the first color component of the image to be printed on the back side of sheet S. Also, the controller positioned the inking head 34 so as to dispense ink corresponding to the color of the image then being written on the plate cylinder. From this point on, the copier operates as described above when printing on one side only, except that the ink transfer step occurs at an ink station 35' defined by the nip of cylinders 26 and 12'.

After at least four revolutions of the print cylinder, a four-color image will have been printed on the back side of sheet S at which point the controller 16 may issue control signals to the grippers 18' on cylinder 12' and to the paper unloader 24 so that the next time the leading edge margin of the paper sheet is uppermost on cylinder 12', it is handed off to the paper unloader 24 and exits the copier.

As noted above, various means such as clips and vacuum ports have been used to hold a paper sheet to a rotating cylinder and to grip and release the sheet. While the conventional hold-down mechanisms or grippers do perform those functions effectively, they do require that openings such as longitudinal slots or lines of holes be formed in the surface of the cylinder. Such openings can cause paper hang-ups and jams. Also, the requirement for such openings limits the flexibility of the cylinder in terms of when, during a particular revolution, a cylinder can pick up or hand off different size sheets of paper. In other words, the number of slots or lines of holes that can be formed around a particular cylinder and serviced in order to operate properly is limited.

Figure 8:
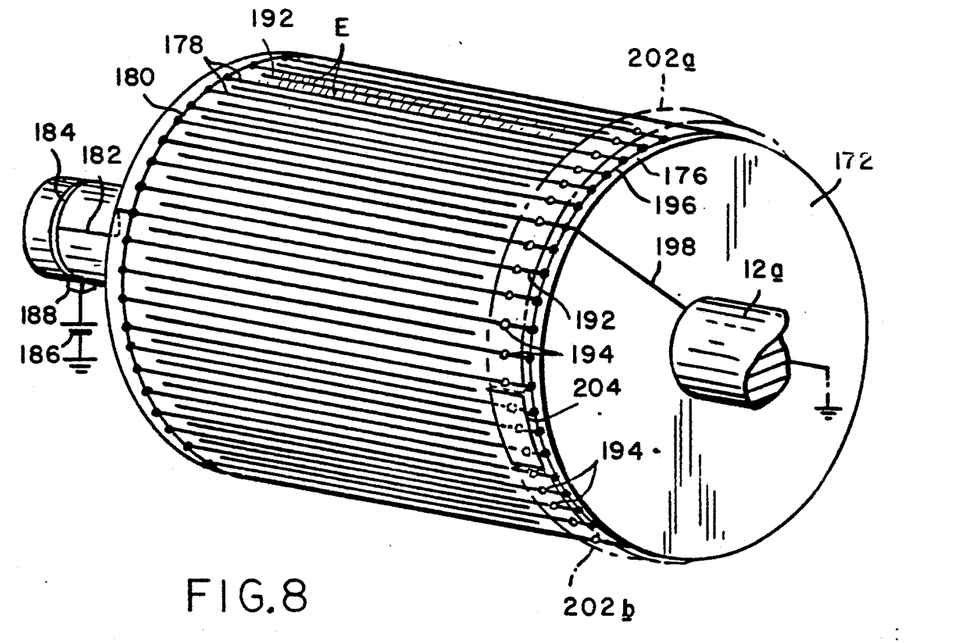
FIG. 8 is a diagrammatic view in perspective of a paper cylinder for the FIG. 1 copier.

For these reasons among others, applicant has devised a completely different electrostatic paper gripper or hold-down mechanism 18, depicted in FIG. 8, which does not require any openings at all in the cylinder surface and which can be packed relatively densely around the circumference of the cylinder, thereby allowing much greater flexibility in the handling of the sheets of paper being printed on during operation of the copier.

As shown in FIG. 8, cylinder 12 (and cylinder 12') comprises a core 172 which is concentric to shaft 12a. Surrounding core 172 is a relatively thin layer 176 of a hard dielectric material such as silicon nitride.

Embedded in layer 176 is a set of thin parallel wires 178 which extend along cylinder 12 and are connected to a common circumferential conductor 180 embedded in layer 176 adjacent to the left end of cylinder 12. Conductor 180 is, in turn, connected by a suitable insulated lead 182 to a slip ring 184 encircling the left end segment of shaft 12a. That ring is connected electrically to a DC voltage source, represented by a battery 186, by means of a conventional brush 188. Interlaced with wires 178 is a second set of similar wires 192 which are connected via separate photoresistors 194 to a second embedded circumferential conductor 196 near the right end of cylinder 12. Conductor 196 is, in turn, connected by a lead 198 to shaft 12a which is grounded. Photoresistors 194 are located at an end segment of cylinder 12 not covered by paper sheet S, e.g., beyond the end of the print cylinder 26.

Normally, no current flows along wires 192 because the photoresistors are usually essentially non-conducting. However, when a photoresistor is exposed to light, its resistance is lowered so that a potential difference exists between the corresponding wire 192 and the adjacent wires 178 on each side of that wire 192. These contiguous conductors of opposite polarity produce contiguous electrostatic fields E which protrude from the dielectric layer 176 all along cylinder 12. These fields induce corresponding capacitive charges in those portions of sheet S positioned opposite the fields since the paper sheet S is of a dielectric material. This give rise to attractive electrostatic forces which are strong enough to hold the sheet S to the cylinder surface.

In other words, each energized wire 192 and its adjacent wires 178 constitute a gripper 18 (FIG. 2). The various grippers 18 (i.e., wires 192) are activated and deactivated at the appropriate times by strategically placed stationary light sources 202a, 202b and masks 204 spaced close from photoresistors 194 at different sectors around cylinder 12 (and cylinder 12'). Sources 202a, 202b may be arcuate arrays of tiny light-emitting diodes (LEDs) whose operations are controlled by controller 16 to execute the various paper handling routines, e.g., load, unload, transfer to cylinder 12', etc.

FIG. 8 shows the positions of the light source arrays 202a, 202b and mask 204 adjacent to paper loader 22 that operate to pick up a sheet S from the loader. When the loader feeds a sheet to cylinder 12, it issues a signal to controller 16 which thereupon turns on a LED array 202a which extends around cylinder 12 from about nine o'clock to almost three o'clock (referring to FIG. 2) and a second LED array 202b which extends from about three o'clock to eight o'clock. Preferably, a mask 204 exists between the ends of the two arrays between eight and nine o'clock to provide a sharp paper transfer or gripping line where cylinder 12 picks up the sheet from loader 22. There may be a similar mask between the opposite ends of the two arrays. LED arrays 202a and 202b remain illuminated all the while sheet S on cylinder 12 is being printed on.

When the time comes to release the sheet from cylinder 12 either to unload the sheet or to print a two-sided copy, controller 16 turns off LED array 202b and turns on the two LED arrays (not shown) opposite cylinder 12' that are comparable to arrays 202a and 202b, thereby to activate the grippers 18' of cylinder of 12'. When the leading edge of sheet S is advanced beyond the end of array 202a, the photoresistors controlling the wires 192 underlying that edge no longer receive light because array 202b is off. Consequently, that edge margin is no longer held to cylinder 12. Rather it is now influenced by the electrostatic fields emanating from cylinder 12' whose grippers 18', as noted above, have been activated. Resultantly, sheet S is handed off from one cylinder to the other as described above. A short time later, controller 16 turns off LED array 202a.

Controller 16 operates in the same manner to turn on and off the similar LED arrays that operate the photoresisters on cylinder 12' so that the grippers 18' of that cylinder hold sheet S while the sheet is being printed on and hand off the sheet to the paper unloader 24 at the end of a printing operation. A mask similar to mask 204 may be present from three to four o'clock at cylinder 12' to define a sharp paper release line at the unloader.

It will be seen from the foregoing, then, that my copier allows the production of high quality copies of color originals on one or both sides of plain paper sheets or other printing substrates. The copying can be carried out efficiently and with a minimum of effort by a machine that requires no fusing on treatment following ink transfer and is compact enough to fit in an office environment.

It should also be appreciated that the objects set forth, among those made apparent from the proceeding description, are efficiently attained, and, since certain changes may be made in the above method and in the construction set forth without departing from the scope invention, it is intended that all matter contained in the above description or shown in the accompanying drawings shall be interpreted as illustrative and not in a limiting sense.

It is also to be understood that the following claims are intended to cover all of the generic and specific features of the invention described herein.

I claim:

1. Reproduction apparatus comprising
    an image member having a slightly ink phobic dielectric surface and a substantially continuous conductive layer under said surface;
    means for writing a pattern of electrostatic image dots on said surface, said writing means including an array of field emission electrodes spaced above said surface,
    means for applying a potential difference between said field emission electrodes and said conductive layer so that ions are produced which propagate toward said surface; and
    control means for controlling the number of ions propagating toward said surface in accordance with digital data representing an original document thereby to charge the areas of said surface opposite said electrodes to variable charge levels so that the image dots of said pattern may have variable field strengths and form a latent electrostatic image of the document on said surface;
    means for presenting an electrostatic ink to said surface whereby said surface acquires ink only at the image dots thereon in amounts proportional to the field strengths of the image dots so as to develop the latent image on said surface;
    means for supporting a printing substrate, and
    means for pressing said surface and the supporting means together so that the ink may be released from said surface to a substrate supported by the supporting means thereby producing a copy of the original document consisting of a pattern of print dots with variable gray scale values.

2. The apparatus defined in claim 1
    wherein the ink is a thermoplastic ink, and
    further including means for heating the ink presenting means and said surface to a temperature above the melting point of the ink to transform the ink into a liquid while hot.

3. The apparatus defined in claim 1 wherein the ink is transparent material that provides a protective overlay for the printed areas on the substrate.

4. A copier comprising
    an image member having a slightly ink phobic dielectric surface;
    means for writing a pattern of electrostatic image dots on said surface;
    control means for controlling the writing means in response to digital data representing an original document so that the image dots of said pattern may have variable field strengths and form a latent electrostatic image of the document on said surface;
    means for presenting an electrostatic thermoplastic ink to said surface whereby said surface acquires ink only at the image dots thereon in amounts proportional to the field strengths of the image dots so as to develop the latent image on said surface;
    means for heating the ink presenting means and the surface to a temperature above the melting point of the ink to transform the ink into liquid while hot;
    means for supporting a printing substrate;
    means for mounting a printing substrate to said supporting means;
    means for pressing said surface and the substrate together so that the ink is released from said surface to the substrate thereby producing a proof copy of the original document consisting of a pattern of print dots with variable gray scale values, and
    means for removing the printing substrate from the supporting means.

5. The copier defined in claim 4 wherein the digital data includes data representing a plurality of color signatures comprising an original document in color so that latent images representing said plurality of signatures are written successively on said surface with each image replacing the image previously written on said surface;

said ink presenting means present selectively to said surface different color inks in response to ink control signals;

control means for issuing ink control signals to the ink presenting means so that the ink presenting means present to the surface the color ink that corresponds to the color of the signature represented by the latent image then being written on said surface.

6. The copier defined in claim 5 wherein the image member is a print cylinder rotatable about an axis and having a cylindrical surface which constitutes said dielectric surface;

the substrate supporting means is a paper cylinder rotatable parallel to the print cylinder and around which the substrate may be wrapped;

the pressing means comprise means for rotating the cylinders so that the substrate is in rolling contact with said surface;

a first latent image representing a first color signature of the original document is written on said surface during one revolution of the print cylinder and a second latent image representing a second color signature of the original document is written on said surface during a succeeding revolution of the print cylinder, and said ink presenting means presents, during said one and succeeding revolutions of the print cylinder, inks whose colors correspond to said first and second signature colors, respectively, so that after said succeeding revolution of the print cylinder, said substrate carries two print dot patterns of different colors which combine to produce a plural color copy of the original document.

7. A copier comprising an image member having a slightly ink phobic dielectric surface and a conductive layer under said dielectric surface;

means for writing a pattern of electrostatic image dots on said surface, said writing means including:
an array of micro-tunnels having mouths disposed opposite said surface,
a field-mission ionization electrode in each micro-tunnel, and
means for providing a potential difference between the ionization electrodes and said conductive layer so that ions are produced by said electrodes which propagate toward said surface;
control means for controlling the writing means in response to digital data representing an original document so that the image dots of said pattern may have variable field strengths and form a latent electrostatic image of the document on said surface, said control means controlling the number of ions which pass through the mouths of said micro-tunnels to said surface in accordance with said digital data thereby to charge the areas of said surface opposite the mouths of said micro-tunnels to variable charge levels which produce said pattern of image dots;

means for presenting an electrostatic ink to said surface whereby said surface acquires ink only at the image dots thereon in amounts proportional to the fields strengths of the image dots so as to develop the latent image on said surface;

means for supporting a printing substrate;

means for mounting a printing substrate to said supporting means;

means for pressing said surface and said substrate together so that the ink is released from said surface to said substrate thereby producing a proof copy of the original document consisting of a pattern of print dots with variable gray scale values, and means for removing the printing substrate from the supporting means.

8. The copier defined in claim 7 wherein said micro-tunnel array is a linear array having a longitudinal axis extending parallel to said surface, and further including means for moving said array and said member relatively so as to scan the mouths of said micro-tunnels over said surface.

9. The copier defined in claim 7 wherein the providing means comprise a gate electrode extending around the walls of each micro-tunnel adjacent to the mouth thereof, and the control means include means for applying a potential difference between said gate electrode and said conductive layer which varies in accordance with said digital data.

10. The copier defined in claim 9 wherein the mounting means include means for electrostatically adhering the printing substrate to said surface.

11. The copier defined in claim 10 wherein said image member includes a dielectric surface layer which forms said surface, and said mounting means include at least one pair of parallel conductors extending along said image member in said surface layer, and means for applying a potential difference between the conductors of said pair to induce a line of electrostatic charges in said surface layer adjacent to said conductor pair which hold said printing substrate to said surface layer.

12. A color copier comprising an image member having a slightly ink phobic dielectric surface and a conductive layer under said surface;

means for writing successive patterns of electrostatic image dots having variable charge densities on said surface in response to a stream of digital data representing plural color components of an original document thereby providing a succession of latent electronic images of said components on said surface, said writing means including an array of field emission electrodes disposed opposite said surface, means for applying a potential difference between said electrodes and said layer so that ions are produced which propagate toward said surface to form said image dots; and control means for controlling the number of ions propagating toward said surface in accordance with digital data representing an original document;

means for presenting a corresponding succession of electrostatic inks to said surface so that said surface acquires ink only at the image dots thereon in amounts proportional to the charge densities of the image dots so as to develop successive latent images on said surface;

means for supporting a printing substrate, and means for pressing said surface and said supporting means together successively so that the successive inks may be released successively from said surface to a substrate supported by the supporting means thereby providing a copy of the original document consisting of variable color patterns of print dots having variable densities.

13. The copier defined in claim 12 wherein the digital data includes data representing a plurality of color signatures comprising an original document in color so that latent images representing said plurality of signatures are written successively on said surface, with each image replacing the image previously written on said surface;

said ink presenting means present selectively to said surface different color inks in response to ink control signals;

control means for issuing ink control signals to the ink presenting means so that the ink presenting means present to the surface the color ink that corresponds to the color of the signature represented by the latent image then being written on said surface.

14. a color copier comprising an image member constituted by a print cylinder rotatable about an axis and having a slightly ink phobic dielectric cylindrical surface;

means for writing successive patterns of electrostatic image dots having variable charge densities on said surface in response to a stream of digital data representing a plurality of color signatures comprising an original document in color so that latent images representing a plurality of signatures one written successively on said surface with a first latent image representing a first color signature of the original document being written on said surface during one revolution of the print cylinder and a second latent image representing a second color signature of the original document being written on said surface during a succeeding revolution of the print cylinder, each image replacing the image previously written on said surface;

means for presenting selectively to said surface in response to ink control signals, a corresponding succession of different color electrostatic inks so that said surface acquires ink only at the image dots thereon in amounts proportional to the charge densities of the image dots so as to develop successive latent images on said surface;

control means for issuing ink control signals to the ink presenting means so that the ink presenting means present to the surface during said one and succeeding resolutions of the print cylinder, inks whose colors correspond to said first and second signature colors, respectively, whereby the ink presented to said surface corresponds to the color of the signature represented by the latent image then being written on said surface;

means for supporting a printing substrate, said supporting means including a paper cylinder rotatable parallel to the print cylinder and around which the substrate may be wrapped;

means for mounting a printing substrate to said supporting means;

pressing means including means for rotating the cylinders so that the substrate is in rolling contact with said surface, said surface and said substrate being pressed together successively whereby the successive inks are released from said surface to the substrate so that after said succeeding resolution of the print cylinder, said substrate carries two print dot patterns of different colors which combine to produce a plural color copy of the original document consisting of variable patterns of print dots having variable densities, and means for removing the printing substrate from said supporting means.

15. The copier defined in claim 14 wherein the image member has a conductive layer under said dielectric surface, and and the writing means comprise an array of micro-tunnels having mouths disposed opposite of said surface, a field-mission ionization electrode in each micro-tunnel, means for providing a potential difference between the ionization electrodes and said conductive layer so that ions are produced by said electrodes which propagate toward said surface, and means for controlling the number of ions which pass through the mouths of said micro-tunnels to said surface in accordance with the digital data thereby to charge areas of said surface opposite the mouths of said micro-tunnels to various charge levels.

16. A color copier comprising an image member having a slightly ink phobic dielectric surface and a conductive layer under said surface;

means for writing successive patterns of electrostatic image dots having variable charge densities on said surface in response to a stream of digital data representing plural color components of an original document thereby providing a succession of latent electronic images of said components on said surface, said writing means including an array of micro-tunnels having mouths disposed opposite said surface, a field-emission ionization electrode in each micro-tunnel, means for providing a potential difference between the ionization electrodes and said conductive layer so that ions are produced by said electrodes which propagate toward said surface, and means for controlling the number of ions which pass through the mouths of the micro-tunnels to said surface in accordance with said digital data stream thereby to charge areas of said surface opposite the mouths of said micro-tunnels to various charge levels;

means for presenting a corresponding succession of electrostatic inks to said surface so that said surface acquires ink only at the image dots thereon in amounts proportional to the charge densities of the image dots so as to develop successive latent images on said surface;

means for supporting a printing substrate;

means for mounting a printing substrate to said supporting means;

means for pressing said surface and said substrate together successively so that the successive inks are released from said surface to the substrate thereby providing a copy of the original document consisting of variable color patterns of print dots having variable densities, and means for removing the printing substrate from the supporting means.

17. The copier defined in claim 16 wherein the controlling means include gate electrodes extending around the walls of said micro-tunnels adjacent to the mouths thereof, and means for applying potential differences between said gate electrodes and said conductive layer which vary in accordance with said digital data.

18. A color copier comprising an image member having a slightly ink phobic dielectric surface;

means for writing successive patterns of electrostatic image dots having variable charge densities on said surface in response to a stream of digital data representing plural color components of an original document thereby providing a succession of latent electronic images of said components on said surface;

means for presenting to said surface a corresponding succession of electrostatic thermoplastic inks which assume a liquid state above a selected temperature so that said surface acquires ink only at the image dots thereon in amounts proportional to the charge densities of the image dots so as to develop successive latent images on said surface;

means for heating said presenting means and said image member above said selected temperature so that said ink is acquired as a liquid by said image member surface and remains a liquid thereon until it is released to a printing substrate;

means for supporting a printing substrate;

means for mounting said printing substrate to said supporting means;

means for pressing said surface and said substrate together successively so that the successive inks are released from said surface to the substrate thereby providing a copy of the original document consisting of variable color patterns of print dots having variable densities, and means for removing the printing substrate from the supporting means.

19. A method of making copies comprising the steps of forming an image member having a slightly ink phobic dielectric surface and a conductive layer under said dielectric surface;

disposing an array of field emission electrodes opposite said dielectric surface;

applying a potential difference between said electrodes and said conductive layer so that ions are produced which propagate toward said dielectric surface to form a pattern of electrostatic image dots on said surface;

controlling the number of ions propagating to said surface in accordance with digital data representing an original document signature so that the image dots of said pattern have variable field strengths and form a latent electrostatic image of the document on said surface consisting of a pattern of electrostatic image dots;

presenting an electrostatic ink to said surface whereby said surface acquires ink only at the image dots thereon in amounts proportional to the field strengths of the image dots so as to develop the latent image on said surface;

forming a printing substrate support and pressing said surface and the substrate support together so that the may be is released from said surface to a substrate supported by the substrate support thereby producing a proof copy of the original document consisting of a pattern of print dots with variable gray scale values.

20. The method defined in claim 19 including the additional steps of providing digital data representing a plurality of color signatures comprising a color original so that latent images representing said plurality of signatures are written successively on said surface with each image replacing the previously written image on said surface;

presenting selectively to said surface different color inks in response to ink control signals;

producing ink control signals so that inks are presented to the surface that correspond to the colors of the signatures represented by the latent images then being written on said surface.

21. The method defined in claim 19 including presenting to said surface a thermoplastic ink which assumes a liquid state above a selected temperature, and heating said ink and said surface above said selected temperature so that said ink is acquired as a liquid on said surface and remains a liquid until it is released to said substrate.

22. The method defined in claim 19 including presenting to said surface a thermoplastic ink which assumes a liquid state above a selected temperature, and heating said ink and said surface above said selected temperature so that said ink is acquired as a liquid on said surface and remains a liquid until it is released to said substrate.

23. A copier comprising an image member having a slightly ink phobic dielectric surface;

means for writing a pattern of electrostatic image dots on said surface;

control means for controlling the writing means in response to digital data representing an original document so that the image dots of said pattern may have variable field strengths and form a latent electrostatic image of the document on said surface;

means for presenting to said surface an electrostatic thermoplastic ink which assumes a liquid state above a selected temperature whereby said surface acquires ink only at the image dots thereon in amounts proportional to the field strengths of the image dots so as to develop the latent image on said surface;

means for heating the presenting means and said image member above said selected temperature so that said ink is acquired as a liquid by said image member surface and remains a liquid thereon until it is released to a printing substrate;

means for mounting a printing substrate to said supporting means, and means for pressing said surface and the substrate together so that the ink is released from said surface to the substrate thereby producing a proof copy of the original document consisting of a pattern of print dots with variable gray scale values without requiring the substrate to pass through a fusing or post-treatment station after the pressing means.

24. A method of making copies comprising the steps of
forming a image member having a slightly ink phobic dielectric surface;
writing a pattern of electrostatic image dots on said surface;
controlling the writing means in response to digital data representing an original document signature so that the image dots of said pattern have variable field strengths and form a latent electrostatic image of the document on said surface;
presenting to said surface an electrostatic thermoplastic ink which assumes a liquid state above a selected temperature whereby said surface acquires ink only at the image dots thereon in amounts proportional to the field strengths of the image dots so as to develop a latent image on said surface;
hearing said ink and said surface above said selected temperature so that said ink is acquired as a liquid on said surface and remains a liquid until it is released to a printing substrate;
forming a printing substrate support;
mounting a printing substrate to said support;
pressing said surface and the substrate together so that the ink is released from said surface to the substrate thereby producing a proof copy of the original document consisting of a pattern of print dots with variable gray scale values, and
removing the printing substrate from the support.

25. Reproduction apparatus comprising
a transport member constituted by a rotatable paper cylinder having a cylindrical surface for supporting a dielectric printing substrate;
an array of first conductors extending along said surface parallel to one another;
an array of second conductors extending along said surface parallel to said first conductors, each second conductor being spaced close to a first conductor to define a narrow gap between them, said first and second conductors being interlaced around said surface to form said gaps;
means for applying a potential difference between selected ones of said first and second conductors to produce electrostatic fields in said gaps which attract and hold the printing substrate to the member surface portions opposite said gaps, said applying means including a voltage source, a switch in circuit between said source and each of the conductors in one of said arrays and means for selectively actuating the switches, said actuating means being located at one or more fixed zones around said cylinder surface opposite switches thereon, said switches being actuated when the cylinder is rotated to position them within a zone, and
means for applying an image to the substrate held to said transport member.

26. The apparatus defined in claim 25 wherein
the switches are light sensitive switches, and
the actuating means comprise light producing means or light blocking means.

27. The apparatus defined in claim 26 wherein the actuating means actuate said switches in relation to the phase angle of said cylinder so as to control the acquisition and release of the printing substrate by the cylinder so that the substrate follows a selected path through the apparatus.

28. Reproduction apparatus comprising
a transport member constituted by a rotatable paper cylinder having a cylindrical surface for supporting a dielectric printing substrate;
an array of first electrodes extending along said surface parallel to one another;
an array of second electrodes extending along said surface parallel to said first electrodes, each second electrode being spaced close to a first electrode to define a narrow gap between them;
means for applying an image to a printing substrate supported by said paper cylinder surface, said image applying means including a print cylinder positioned adjacent and parallel to said paper cylinder;
an auxiliary cylinder similar to said paper cylinder rotatably mounted adjacent and parallel to said paper cylinder and said print cylinder;
means for applying a potential difference between selected ones of said first and second electrodes of each of said paper cylinder and said auxiliary cylinder to produce electrostatic fields in said gaps of said paper cylinder and said auxiliary cylinder which attract and hold the printing substrate to the respective cylinder surface portions opposite said gaps;
moving means for moving said paper cylinder and said auxiliary cylinder into and out of rolling engagement with said print cylinder such that said movements are 180° out of phase, and
means for controlling said potential difference applying means and said moving means so that a printing substrate wrapped around and held to the surface of the paper cylinder with the front side of that substrate facing the plate cylinder may be transferred to and wrapped around the auxiliary cylinder so that the back side of the substrate faces the print cylinder.

29. A copier comprising
an image member having a slightly ink phobic dielectric surface and a conductive layer under said surface;
means for writing a pattern of electrostatic image dots on said surface;
control means for controlling the writing means in response to digital data representing an original document so that the image dots of said pattern may have variable field strengths and form a latent electrostatic image of the document on said surface;
means for presenting an electrostatic thermoplastic ink to said surface whereby said surface acquires ink only at the image dots thereon in amounts proportional to the field strengths of the image dots so as to develop the latent image on said surface;
means for heating the ink presenting means and said surface to a temperature above the melting point of the image to transform the ink into a liquid while hot;
means for supporting a printing substrate, and
pressing means for pressing said surface and said supporting means together so that the ink may be released from said surface to a substrate supported by the supporting means thereby producing a proof copy of the original document consisting of a pattern of print dots with variable gray scale values.

* * * * *